Z. C. WARREN.
Manufacture of Sulphate of Lime.
No. 220,005.  Patented Sept. 23, 1879.
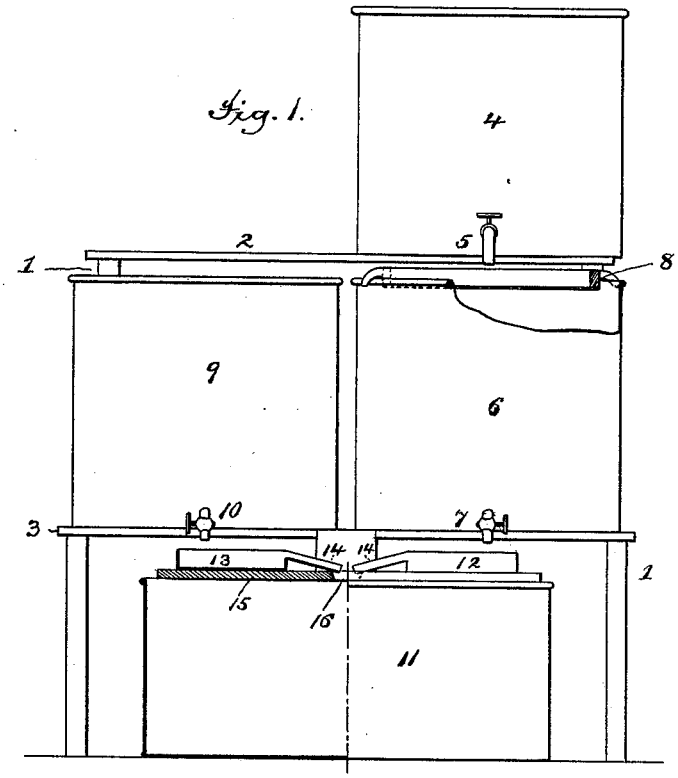
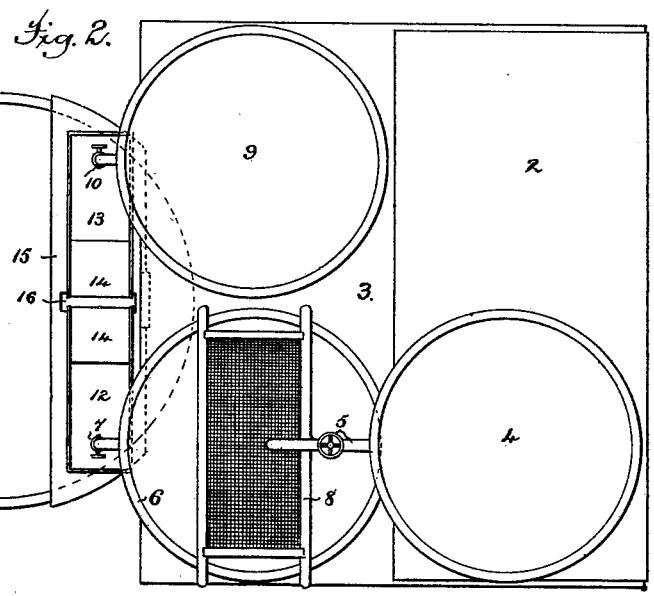
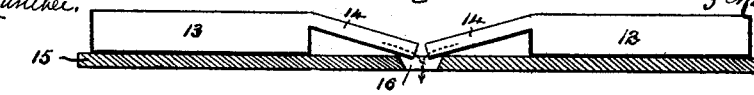

UNITED STATES PATENT OFFICE.

ZENAS C. WARREN, OF NEW YORK, N. Y.

IMPROVEMENT IN THE MANUFACTURE OF SULPHATE OF LIME.

Specification forming part of Letters Patent No. 220,005, dated September 23, 1879; application filed June 24, 1879.

*To all whom it may concern:*

Be it known that I, ZENAS C. WARREN, of the city, county, and State of New York, have invented certain new and useful Improvements in the Manufacture of Sulphate of Lime, and in the sulphate of lime produced thereby; and I do hereby declare the following to be a full, clear, and exact description of the same, reference being had to the accompanying drawings, forming a part of this specification.

Prior to my invention artificial sulphate of lime had been made by dissolving carbonate of lime in muriatic acid, then precipitating it with sulphuric acid or by a soluble sulphate, and then treating it to successive washings to remove the free acid. Unless great care was taken in the washing, and even then, traces of the acid were liable to remain, and thus render it unsafe to use as a filling in the manufacture of paper, as a dressing for cotton cloth and other articles which the acid would attack and damage. It was also expensive to manufacture.

Natural sulphate of lime, as calcined gypsum, before it could be used as a filling for paper, had to be comminuted, which it was difficult to properly do; and then it was liable to contain crystals, which, in the manufacture of paper, appeared in spots in the latter after calendering.

Other objections existed to the use, especially as a filling for paper, of both artificial and natural sulphate of lime prior to my invention, the principal one of which was that their specific gravity was greater than that of the paper-pulp, which caused them to settle when mixed in a fluid state with the paper-pulp, and thus waste in the bottoms of the vats and through the wire-cloth of the paper-machine.

The object of my invention is to produce sulphate of lime free from foreign or gritty substance, not liable to detract from the value of paper or cotton cloths, or damage the same when used in their manufacture, and not liable to injure the same after they are manufactured, having a specific gravity about the same as paper-pulp, and much better than the artificial or natural sulphate of lime used prior to my invention; and it consists in the process of producing sulphate of lime, in the sulphate of lime produced by such process as a new article of manufacture, and in one form of apparatus for carrying out my invention, all which will be hereinafter fully described and claimed.

In carrying out my invention I use caustic lime and sulphuric acid of 66° Baumé, preferably in the proportions of sixteen parts of the former to twenty-seven parts of the latter.

I prepare the caustic lime preferably by first slaking the same in four times its weight of water in a proper tank or vessel, and after it is thoroughly slaked, I add water enough to make ten pounds of water to one pound of lime, thus producing a good milk of lime, which I screen or strain to remove foreign substances or grit.

I prepare the sulphuric acid preferably by mixing one part of the same with six parts of water in a proper tank or vessel.

After the milk of lime and sulphuric acid have been thus prepared, they are allowed to cool before being brought together to form sulphate of lime. After they are cool, they are combined to form sulphate of lime by bringing them together in streams that commingle and fall into a proper vat or vessel, or by placing them together, or mixing them in a vat or vessel, or by causing them to flow together in thin sheets and fall into a proper vat or vessel. When they are brought together in streams that commingle, or are placed or mixed together in a vat or vessel, the sulphate of lime produced is liable to be lumpy, and requires comminuting before it can be properly used. When they are brought together in thin sheets, the sulphate of lime is free from lumps, and this mode of combining them I therefore prefer to use.

The sulphate of lime produced when either of these modes of combining the prepared sulphuric acid and milk of lime is used is free from foreign substances or grit, is about the specific gravity of paper-pulp, and can be used as a filling in the manufacture of paper or as a dressing in the manufacture of cotton cloth with better results than have been heretofore obtained by the use of artificial or natural sulphate of lime heretofore employed.

It is obvious that the sulphate of lime thus produced may be used for other purposes than those named.

The apparatus I prefer to employ for carrying out my invention is constructed and used as follows:

In the drawings, Figure 1 is a front elevation of the apparatus. Fig. 2 is a plan view of the same. Fig. 3 is a sectional view of part of the same on an enlarged scale.

1 represents the frame-work, to which are secured two platforms, 2 3. On the platform 2 a tank, 4, is placed for containing the caustic lime, and water used in slaking the same, which tank is provided with a suitable cock or valve, 5, to draw off the milk of lime when ready.

6 is a tank resting on the second platform, 3, beneath the cock or valve 5, to receive the milk of lime after it has been properly prepared, as before described, and is provided with a suitable cock or valve, 7, for drawing off the milk of lime, after being strained, to combine with the sulphuric acid. A sieve or strainer, 8, capable of being removed for cleaning, rests on top of this tank 6 under the cock or valve 5. Through this strainer the milk of lime passes, and is thus freed from foreign substances or grit before entering the tank 6.

9 is a tank resting on the platform 3, for containing the sulphuric acid, provided with a suitable cock or valve, 10, to draw off the acid to combine with the milk of lime.

11 is a tank for receiving the sulphate of lime produced by the combining of the sulphuric acid and milk of lime.

12 and 13 are pans placed under the cocks 7 and 10, respectively, each provided with an apron, 14, to spread the milk of lime and sulphuric acid in thin sheets, and direct them, as they issue from the pans 12 and 13, so that the sulphuric acid and milk of lime will combine effectually when they come in contact after falling from the aprons. These pans 12 and 13 rest upon a support, 15, over the tank 11, said support having an opening, 16, through which the sulphuric acid and milk of lime fall, forming sulphate of lime, which is caught by the tank 11. A stirrer can be used in this latter tank if desired.

In using this apparatus I place in the tank 4 the caustic lime and water, preferably in the proportions above stated, and after it is thoroughly slaked add a further quantity of water, as before described. I then draw off the milk of lime thus produced through the cock 5 into the sieve 8, through which it passes into the tank 6, being thus freed from foreign substances and grit. I place the sulphuric acid and water in the tank 9, preferably in the proportions before stated, and allow it and the milk of lime in the tank 6 to cool. I then draw off the milk of lime through the cock 7, allowing it to flow into the pan 12, and the sulphuric acid through the cock 10, allowing it to flow into the pan 13. From these pans the milk of lime and sulphuric acid flow over the aprons 14 in thin sheets, and, meeting, combine, forming sulphate of lime, which falls into the tank 11 in a pulpy mass. From this tank it can be taken in the condition in which it exists therein, for use in the filling of paper, in the dressing of cloth, and for other purposes; or it can be pressed into cakes, and thus readily shipped to users.

When the milk of lime and sulphuric acid are brought together in streams that commingle, or are placed together, or are mixed in a vat or vessel, the lumpy sulphate of lime thus produced, after being comminuted, can be used or pressed into cakes for use.

I do not confine myself to the exact proportions of sulphuric acid and caustic lime above given, or the exact proportions of the sulphuric acid and the lime with water in their preparation above recited, as they may be varied. These proportions, however, should be such as to enable the sulphuric acid and milk of lime to combine together and produce sulphate of lime, either neutral, which the proportions above given will effect for a filling for paper and dressing for cotton cloth, or for uses other than for filling paper or for dressing cotton cloth not neutral.

This sulphate of lime is a beautiful pearl-white color, free from grit, of a specific gravity much lighter than the natural or artificial sulphate of lime used prior to my invention, and is readily distinguishable in the market from the same. It is particularly useful as a filling for the finer grades of writing and printing paper, and can be employed in place of terra alba, paris-white, the natural sulphate of lime, the artificial sulphate of lime used prior to my invention, and as a substitute for china-clay used for dressing cotton cloths.

Having thus described my invention, what I desire to secure by Letters Patent is—

1. The process of producing sulphate of lime by first preparing the milk of lime and sulphuric acid in proper combining proportions, then allowing them to cool, then bringing them together, and then collecting the sulphate of lime so formed in the tank, substantially as described.

2. As a new article of manufacture, sulphate of lime having about the specific gravity of paper-pulp, produced by first preparing the milk of lime and sulphuric acid in combining proportions, then allowing them to cool, and then bringing them together, then collecting the hydrated mass of sulphate of lime so formed, substantially as described.

3. The combination of the tanks 9 and 6, containing the sulphuric acid and milk of lime, with pans, each provided with an apron for spreading the acid and milk of lime in thin sheets, substantially as described.

4. The pans provided with aprons, arranged so as to spread the contents of the pans in thin sheets and direct them as they issue therefrom.

In testimony whereof I have signed my name to this specification in the presence of two subscribing witnesses.

ZENAS C. WARREN.

Witnesses:
HENRY I. THORNTON,
M. B. PHILIPP.